United States Patent
Luo et al.

(10) Patent No.: US 12,047,379 B2
(45) Date of Patent: Jul. 23, 2024

(54) DATA ACCESS CONTROL MANAGEMENT COMPUTER SYSTEM FOR EVENT DRIVEN DYNAMIC SECURITY

(71) Applicant: International Business Machines Corporation, Armonk, NY (US)

(72) Inventors: Lan Luo, Beijing (CN); Chun Qing W Wu, Beijing (CN); Li Ni Zhang, Beijing (CN); Li Jiang, Beijing (CN); Wen Rui Zhao, Beijing (CN); Jing Bo Jiang, Beijing (CN); Yu Zhao, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 17/444,391

(22) Filed: Aug. 4, 2021

(65) Prior Publication Data

US 2023/0039584 A1 Feb. 9, 2023

(51) Int. Cl.
*H04L 9/40* (2022.01)
(52) U.S. Cl.
CPC ............ *H04L 63/101* (2013.01); *H04L 63/02* (2013.01); *H04L 63/1416* (2013.01)
(58) Field of Classification Search
CPC ... H04L 63/02; H04L 63/101; H04L 63/1416; H04L 63/1425
See application file for complete search history.

(56) References Cited

U.S. PATENT DOCUMENTS

| 8,464,312 | B1* | 6/2013 | Schneider | ........... H04L 63/0218 726/1 |
|---|---|---|---|---|
| 10,148,677 | B2 | 12/2018 | Muddu | |
| 10,244,001 | B2 | 3/2019 | Smith | |
| 10,375,071 | B1* | 8/2019 | Hydell | ..................... H04L 63/10 |
| 10,530,776 | B2 | 1/2020 | Grant | |
| 10,587,577 | B2 | 3/2020 | Adler | |
| 10,623,281 | B1 | 4/2020 | Zhao | |
| 2004/0054896 | A1* | 3/2004 | Himmel | .............. G06F 21/6218 726/4 |
| 2006/0259967 | A1* | 11/2006 | Thomas | ................ H04L 63/145 726/22 |

(Continued)

OTHER PUBLICATIONS

Bertolissi, et al., "Dynamic Event-Based Access Control as Term Rewriting", Proceedings of the 21st annual IFIP WG 11.3 working conference on Data and Applications Security, Jul. 2007, pp. 195-210, <https://dl.acm.org/doi/10.5555/1770560.1770581>.

(Continued)

*Primary Examiner* — Daniel B Potratz
*Assistant Examiner* — Matthias Habtegeorgis
(74) *Attorney, Agent, or Firm* — Michael A. Petrocelli

(57) ABSTRACT

Managing security access in real-time to a computer system using control lists includes detecting a security event at a computer system. The security event is analyzed including an analysis of a historical corpus having historical data of security events. An access control list is generated based on the security event. A determination is made when the security event includes abnormal behavior based on the analysis of the security event and the historical corpus. The security event is published to a monitoring system for controlling access to the computer system, in response to the security event.

20 Claims, 14 Drawing Sheets

(56) References Cited

U.S. PATENT DOCUMENTS

| | | | |
|---|---|---|---|
| 2008/0034425 A1* | 2/2008 | Overcash | G06F 21/55 |
| | | | 726/22 |
| 2008/0133740 A1* | 6/2008 | Aliverti | G07B 15/00 |
| | | | 709/224 |
| 2013/0179538 A1* | 7/2013 | Dutta | H04L 43/0817 |
| | | | 709/217 |
| 2015/0121456 A1* | 4/2015 | Milman | H04L 63/10 |
| | | | 726/3 |
| 2015/0334119 A1* | 11/2015 | Schmitt | H04W 12/084 |
| | | | 726/3 |
| 2017/0289178 A1* | 10/2017 | Roundy | H04L 63/1425 |
| 2018/0077184 A1* | 3/2018 | Thom | H04L 63/10 |
| 2018/0115620 A1 | 4/2018 | Diem | |
| 2018/0324204 A1* | 11/2018 | McClory | G06F 9/5027 |
| 2019/0068620 A1* | 2/2019 | Avrahami | H04L 63/1441 |
| 2021/0234901 A1* | 7/2021 | Thomas | H04L 63/0263 |
| 2021/0329013 A1* | 10/2021 | Diehl | G06F 16/24568 |

OTHER PUBLICATIONS

Mell, et al., "The NIST Definition of Cloud Computing", National Institute of Standards and Technology, Special Publication 800-145, Sep. 2011, 7 pages.

* cited by examiner

DATA ACCESS CONTROL MANAGEMENT COMPUTER SYSTEM FOR EVENT DRIVEN DYNAMIC SECURITY

BACKGROUND

The present disclosure relates to data security and access control in, for example, a cloud based or private or dedicated data storage system.

Computer and data related security are important in the Information Technology (IT) field whether the computer environment is a cloud-based computer system or a private or dedicated data storage system. Existing solutions for a serverless and a microservice system's access management is static and pre-defined. Such solutions can have high maintenance costs, and be unable to meet dynamic access management requirements for serverless and microservice systems. Further, existing solution may be hard to manage due to not having fine-grained access control and may be unable to meet a real-time access change.

SUMMARY

The present disclosure recognizes the shortcomings and problems associated with current techniques for to data security and access control in, for example, a cloud based or private or dedicated data storage.

Method and system according to the present invention can include a method to manage an access control list in a real-time manner. A method can define fine-grained security access control via an event driven system. A method can provide a traceable and a historical access control list with flexibility. A method can provide a dynamic means to rollback access control lists.

In an aspect according to the present invention, a computer-implemented method for managing security access in real-time to a computer system using control lists, which includes detecting, at a computer, a security event at a computer system. The method includes analyzing, using the computer, the security event, and subscribing the security event to an event manager, and the analysis of the security event includes an analysis of a historical corpus having historical data of security events. The method includes generating an access control list based on the security event. The method includes determining when the security event includes abnormal behavior based on the analysis of the security event and the historical corpus. The method includes publishing the security event to a monitoring system, using the event manager, for controlling access to the computer system, in response to the determining of the security event including the abnormal behavior.

In a related aspect, an event includes access to at least a portion of computer data in the computer system.

In a related aspect, the historical data includes security resources, security messages, and security audit information.

In a related aspect, the method can further include communicating with a course system to detect the event; and generating pre-defined events regularly.

In a related aspect, the method can further include communicating with the monitoring system to detect dynamic security events in real-time.

In a related aspect, the method can further include determining event types for security events, and sending a security message with an event type for each of the security events to the monitoring system.

In a related aspect, the further include determining an event type for the security event; registering the event type with the monitoring system; and sending a security message of the event and the event type to the monitoring system.

In a related aspect, the monitoring system can include a distributed event streaming system.

In a related aspect, the method can include generating a model, using the computer, which at least in part incorporates the analyzing of the security event. The model includes updating the analysis of the security event; updating the access control list; updating the determination of when the security event includes the abnormal behavior; and updating the publishing of the security event.

In a related aspect, the method can further include iteratively generating the model to produce updated models.

In another aspect according to an embodiment of the present invention, a system using a computer for managing security access in real-time to a computer system using control lists, includes a computer system comprising; a computer processor, a computer-readable storage medium, and program instructions stored on the computer-readable storage medium being executable by the processor, to cause the computer system to perform the following functions to; detect, at a computer, a security event at a computer system; analyze, using the computer, the security event, and subscribe the security event, the analysis of the security event including an analysis of a historical corpus having historical data of security events; generate an access control list based on the security event; determine when the security event includes abnormal behavior based on the analysis of the security event and the historical corpus; and publish the security event to a monitoring system for controlling access to the computer system, in response to the determine of the security event including the abnormal behavior.

In a related aspect, the historical data includes security resources, security messages, and security audit information.

In a related aspect, the system includes communicating with a course system to detect the event; and generating pre-defined events regularly.

In a related aspect, the system further includes communicating with the monitoring system to detect dynamic security events in real-time.

In a related aspect, the system can further include determining event types for security events, and sending a security message with an event type for each of the security events to the monitoring system.

In a related aspect, the system can further include determining an event type for the security event; registering the event type with the monitoring system; and sending a security message of the event and the event type to the monitoring system.

In a related aspect, the monitoring system includes a distributed event streaming system.

In a related aspect, the system can further include generating a model, using the computer, which at least in part incorporates the analyzing of the security event; and the model including: updating the analysis of the security event; updating the access control list; updating the determination of when the security event includes the abnormal behavior; and updating the publishing of the security event.

In a related aspect the system further includes iteratively generating the model to produce updated models.

In a related aspect, according to an embodiment of the present invention, a computer program product for managing security access in real-time to a computer system using control lists, comprising a computer readable storage medium having program instructions embodied therewith. The program instructions are executable by a computer to cause the computer to perform functions, by the computer, comprising the functions to: detect, at a computer, a security event at a computer system; analyze, using the computer, the security event, and subscribe the security event, the analysis of the security event including an analysis of a historical corpus having historical data of security events; generate an access control list based on the security event; determine when the security event includes abnormal behavior based on the analysis of the security event and the historical corpus; and publish the security event to a monitoring system for controlling access to the computer system, in response to the determine of the security event including the abnormal behavior.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
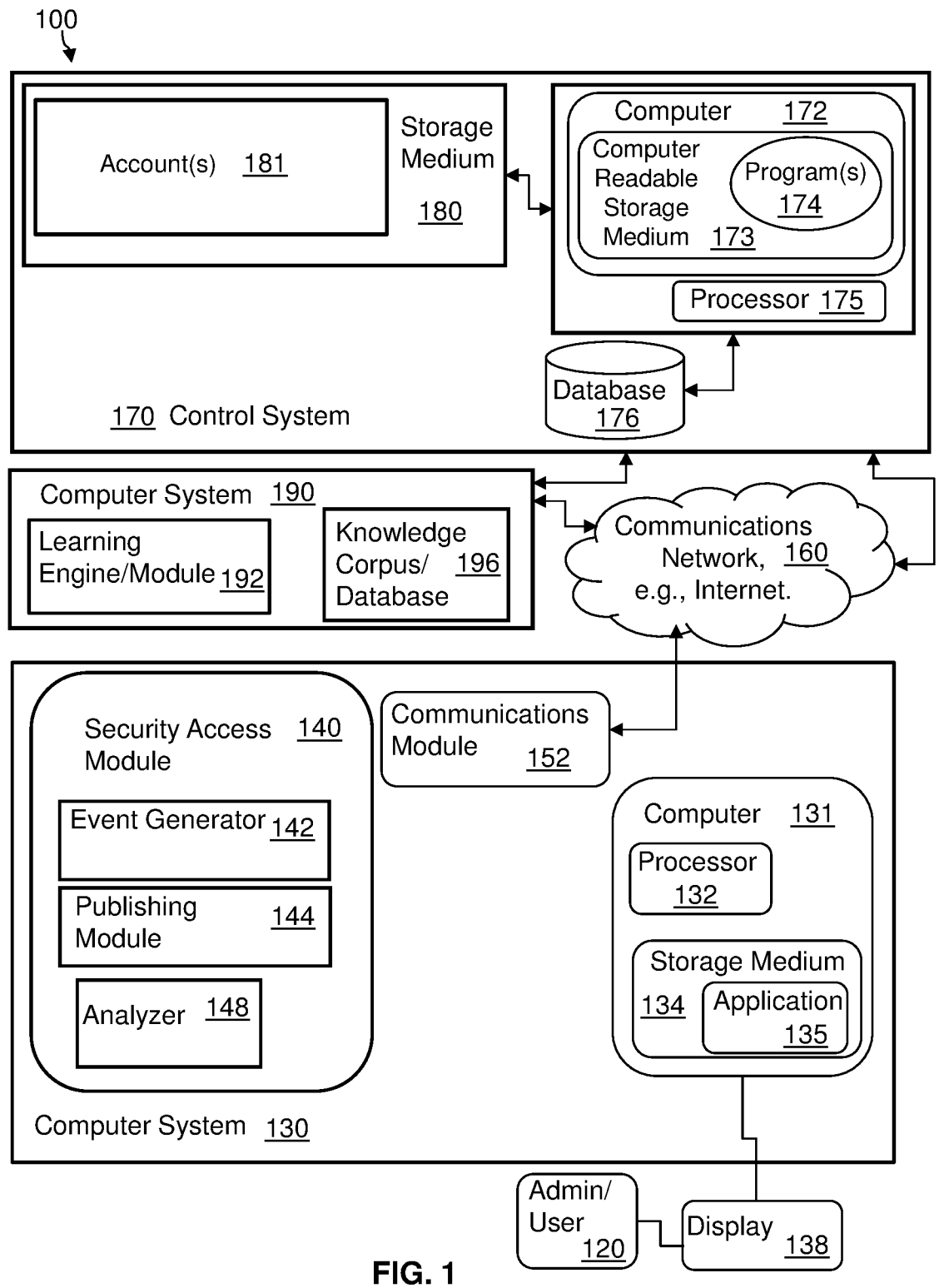
FIG. 1 is a schematic block diagram illustrating an overview of a system, system features or components, and methodology for managing security access in real-time to a computer system using control lists, according to an embodiment of the present disclosure.
Figure 2:
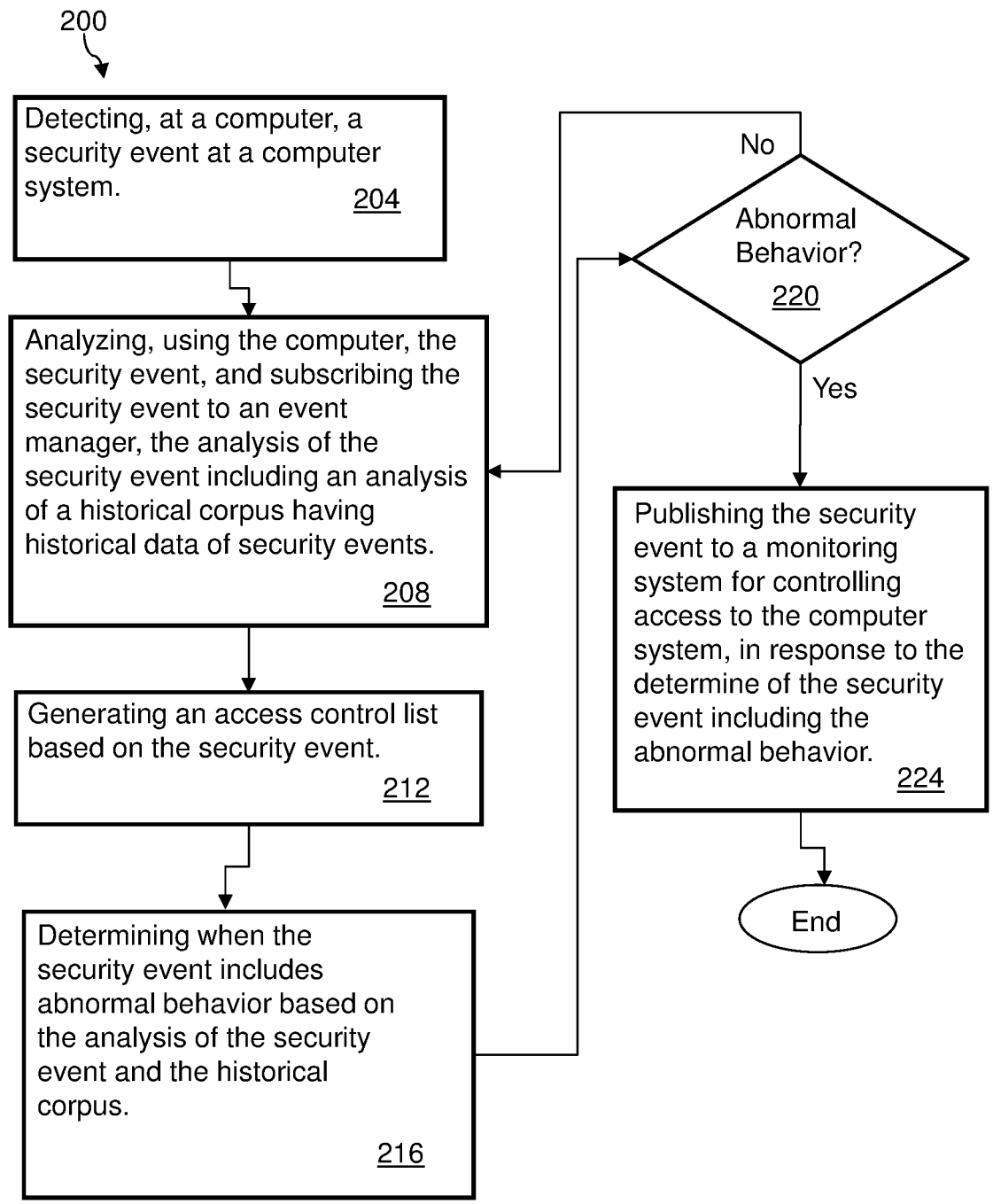
FIG. 2 is a flow chart illustrating a method, implemented using the system shown in FIG. 1, for managing security access in real-time to a computer system using control lists, according to an embodiment of the present disclosure.
Figure 3:
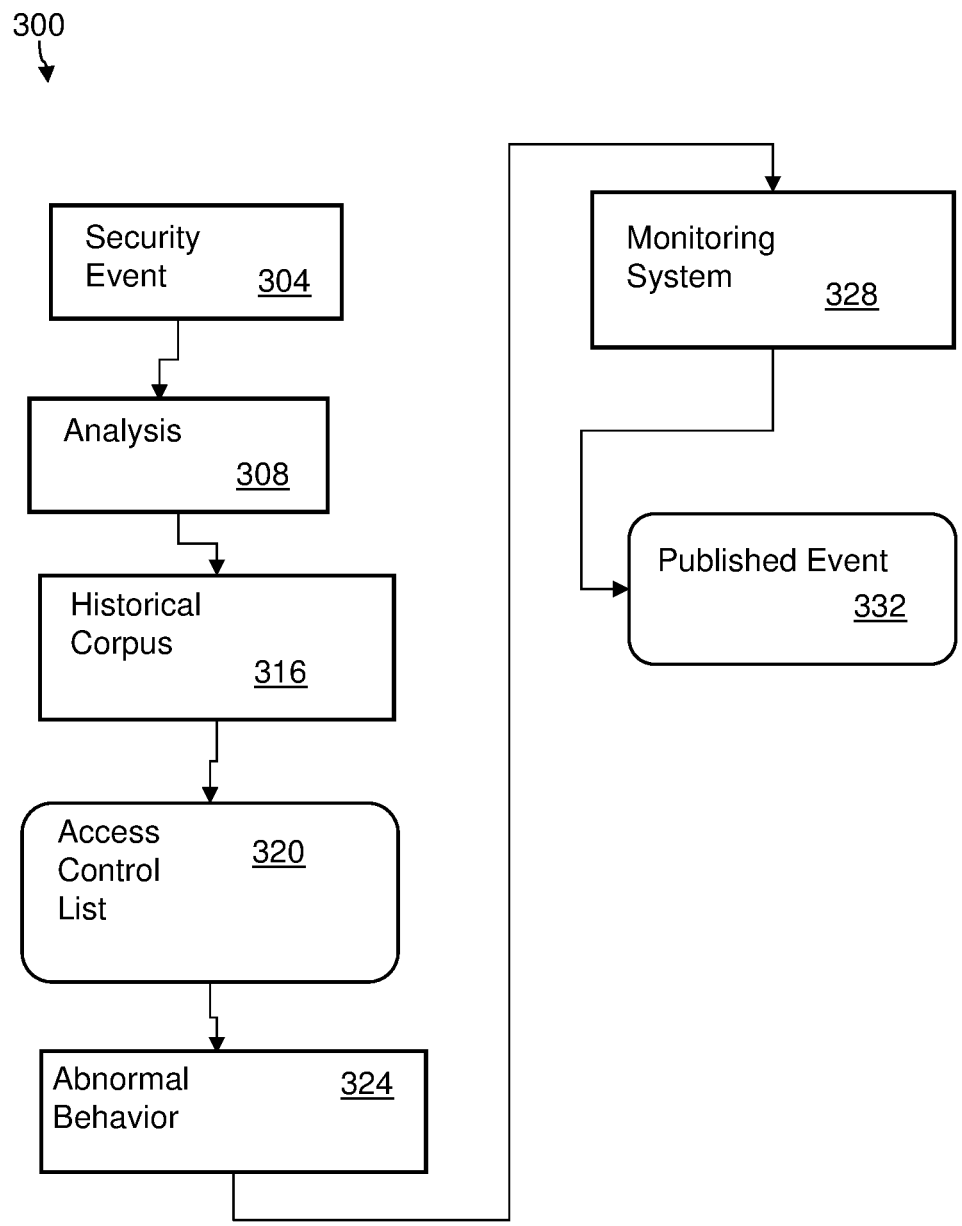
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for managing security access in real-time to a computer system using control lists.

Referring to FIGS. 1, 2 and 3, a computer-implemented method 200 for managing security access in real-time to a computer system using control lists, according to an embodiment of the present disclosure, includes operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 can include a computer for detecting a security event at a computer system. The event can include access to at least a portion of computer data in the computer system. The computer can be a computer 131 in a computer system or device 130, or a computer 190 remote from the system 130. The computer 131 can communicate, all or in part with, a computer 172 which can be remote as part of a control system 170, or all or part of a remote server. The control system can include a computer 172 having a computer readable storage medium 173 which can store one or more programs 174, and a processor 175 for executing program instructions. The control system can also include a storage medium which can include registration and/or account data 182 and profiles 183 of users as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 of the system 130 and can be remote from the system 130. In another example, the computer system 190 can be all or part of the control system, or all or part of the system 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of the system 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device can include a display 138 viewable by a user 120. The system 130 can operate, in all or in part, in conjunction with a remote server by way of a communications network 160, for example, the Internet. The system 130 can be a mobile device such as a mobile phone, or tablet, or a laptop computer.

Referring to FIGS. 1, 2, and 3, the method 200 can include detecting, at a computer 131, a security event 304 at a computer system 130, as in block 204. A security event can include access to at least a portion of computer data in the computer system. The access can be an access request to attempt to access computer data.

The method includes analyzing, using the computer and/or an analyzer 148, the security event, and subscribing the security event to an event manager, the analysis of the security event including an analysis 308 of a historical corpus 316 having historical data of security events, as in block 208. The historical corpus can be part of the knowledge corpus 196. Also, the analysis can, in all or part of, an AI system including machine learning. A security access module 140 can include an event generator 142, a publishing module 144 and an analyzer 148. A communications module 152 for communicating with other networks, and/or communicating with the Internet 160 can also be part of the computer system 130.

Further, the analysis 308 can include generating a model 352 of pairing scenarios for the user device with devices at the location. Such a model can be an output at least in part of an AI system analysis using machine learning.

The knowledge corpus 196 can be populated by historical data gathered from one or more computer systems related to data access.

The method includes generating an access control list 320, for example using an event generator 142, based on the security event 304, as in block 212. The method includes determining when the security event includes abnormal behavior 324 based on the analysis of the security event and the historical corpus, as in block 216.

When the security event does not include abnormal behavior, the method can return to block 208. When the security event includes abnormal behavior, the method continues to block 224.

The method includes publishing, using a publishing module 144, the security event to a monitoring system 328 for controlling access to the computer system, in response to the determine of the security event including the abnormal behavior, as in block 220. A published event 332 can be made available or viewable for inquiry and other system by the monitoring system 328.

The historical data can include security resources, security messages, and security audit information.

The method can further include communicating with a course system to detect the event, and generate pre-defined events regularly. The method can further include communicating with the monitoring system to detect dynamic security events in real-time.

The method can further include determining event types for security events, and sending a security message with an event type for each of the security events to the monitoring system.

The method can include determining an event type for the security event; registering the event type with the monitoring system; and sending a security message of the event and the event type to the monitoring system.

The monitoring system can include a distributed event streaming system.

In one example, the method can include generating a model, using the computer, which at least in part incorporates the analyzing of the security event. The model can include updating the analysis of the security event; updating the access control list; updating the determination of when the security event includes the abnormal behavior; and updating the publishing of the security event. The method can include iteratively generating the model to produce updated models.

Figure 4:
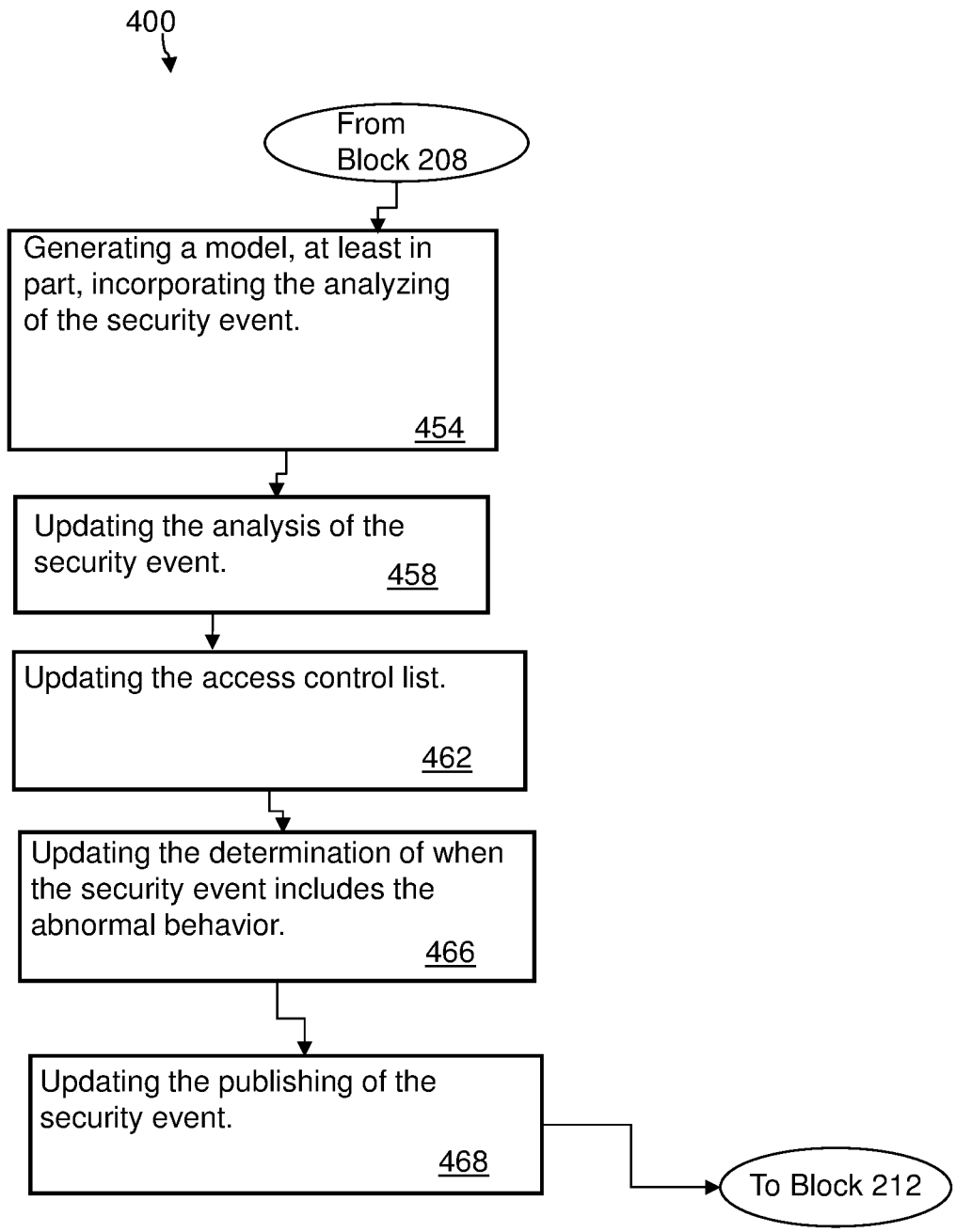
FIG. 4 is a flow chart illustrating another method, which continues from the flow chart of FIG. 2, for managing security access in real-time to a computer system using control lists, and which generates and uses a computer model.

Referring to FIG. 4, in another embodiment according to the present disclosure a method 400 can continue from block 208 of the method 200 shown in FIG. 2, and the method 400 includes generating a model, using the computer, which at least in part incorporates the analyzing of the security event. As in block 454. The model can include updating the analysis of the security event, as in block 458. The method can include updating the access control list, as in block 462, and updating the determination of when the security event includes the abnormal behavior, as in block 466. The method can include updating the publishing of the security event, as in block 468. Further, the method can include iteratively generating the model to produce updated models.

In another example, the method can further include the existing ecosystem communicating with the cloud based account using a communications network. In another example, the historical data can be stored in a knowledge corpus database. In another example, the remote-based account can be cloud based.

In another example, related to the method 450, the model 312 can include determining, using the computer, a type of machine and workflow, using the knowledge corpus database 156 to determine a type of machine, a type of workflow, or define one or more workflows. The knowledge corpus 196 can be populated by historical data related to machine/devices, environments, AI ecosystems, etc., gathered from previous environments and histories. In one example the data from historical events can be automatically gathered, and in another example, data can be inputted into the computer or directly into the corpus automatically, manually, or a combination of both, or in another example or from the computer to the corpus, such as from IoT devices, etc. In one example, the computer can identify machine or devise in the AI environments by comparing a visual picture or video feed of an object to a corpus database of items. The identification can be scored for veracity or confidence of identification with a confidence score.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 150 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data can be stored. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. In one example, a user can register or create an account using the control system. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5:
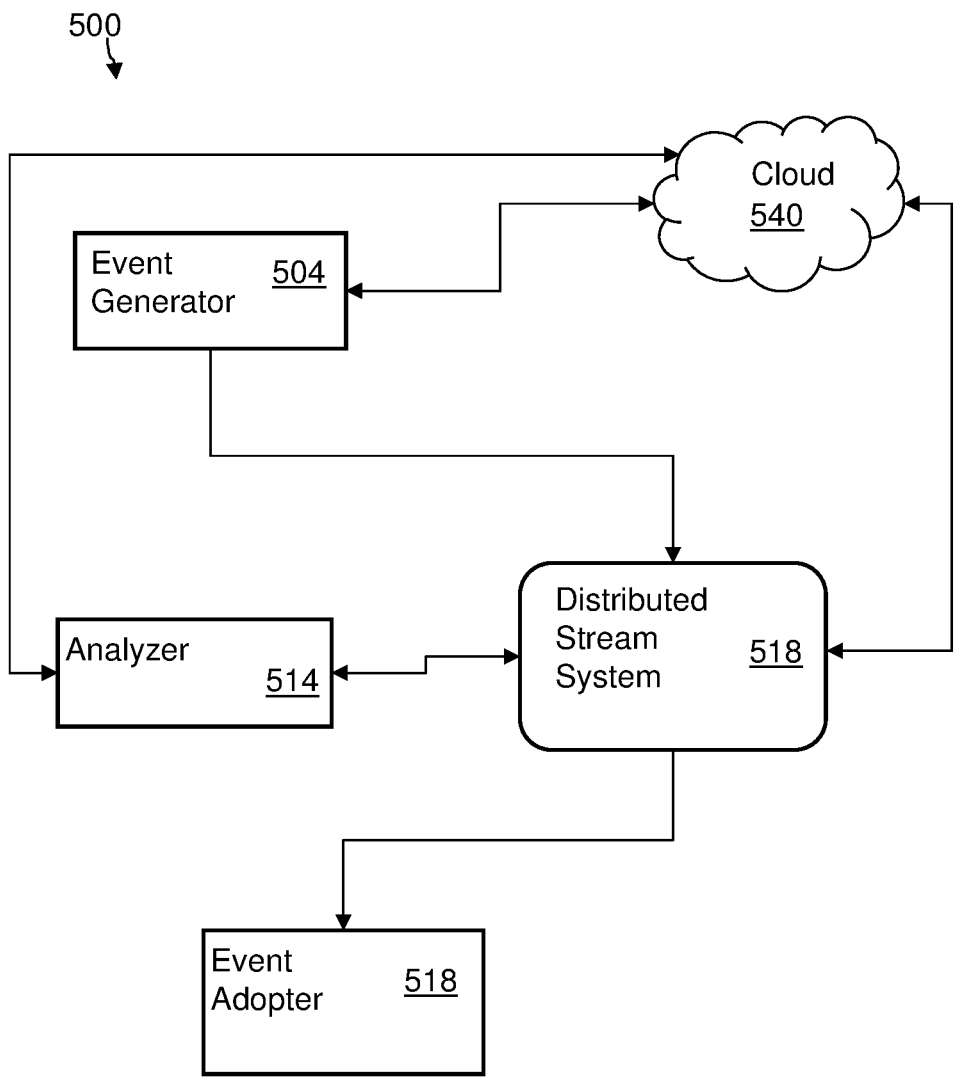
FIG. 5 is a block diagram illustrating another system according to an embodiment of the present disclosure, for managing security access in real-time to a computer system using control lists.

Referring to FIG. 5, in one embodiment according to the present disclosure, a system 500 can be used for managing security access in real-time to a computer system using control lists, also can be referred to as an event-based access control system. In one example, the system 500 according to the present disclosure can include an event generator 502, an analyzer 504, a distributed stream system 506, and an event adapter 508.

The event generator can have a source, for example a cloud-based system, an IKS (Internet Key Sharing) system, or a time-based job scheduler.

An event can include the computer system allowing access to an object based on an ACL (Access Control List) including a registry of a public key to each host. It is understood that an ACL is a list of user permissions for a file, folder, or other object, and can define users or groups of users that can access an object and the operations they can perform. For example, operations can include read, write, and execute.

An event can include operations personnel starting a deployment, using an ACL which has a registry with a public key to each host. An event can include a new node being added, using an ACL which adds a private IP to an IP whitelist. An event can include a new label being added for a pod, using an ACL which allows access to specific users or groups of users based on labels. AN event can include a cleanup demonstration (demo) or trial version, using an ACL which uses a cleanup demo or account in a demo system.

In one example, an overview of components of the system 500 can include a distributed stream system which can include event management, storing the real-time and historical security event resources/messages, and storing security events and reference and audit information.

In another example, an event generator can include a registry of a new security event type into an event stream system. The event generator can include publishing security events and messages, and swiping the security events and messages.

In another example, an event adopter can include subscribing security events/messages into the event stream system. The event adopter can include consuming various security event and creating or updating an access control list.

In another example, the analyzer can include consuming various security events to analyze historical events. The analyzer can include detecting any security events flood or abnormal behaviors. Also, the analyzer can include communicating with the event generator to publish events for a monitoring system.

Event generator can be a system which publishes events to allow a third party or other system to administrate access management, such as a private cloud, a public cloud, a human resources system, a monitoring system, etc. In one example, an event generator client can publish an event by installing the generator client on a source system/components. The generator can communicate with the source system to detect various events and generates pre-defined events regularly. The generator communicates with the monitor agent (any existing monitor solution) to detect dynamic events. The generator can register event types to distributed event streaming system. The generator can send security events/messages to distributed event streaming system.

Figure 6:
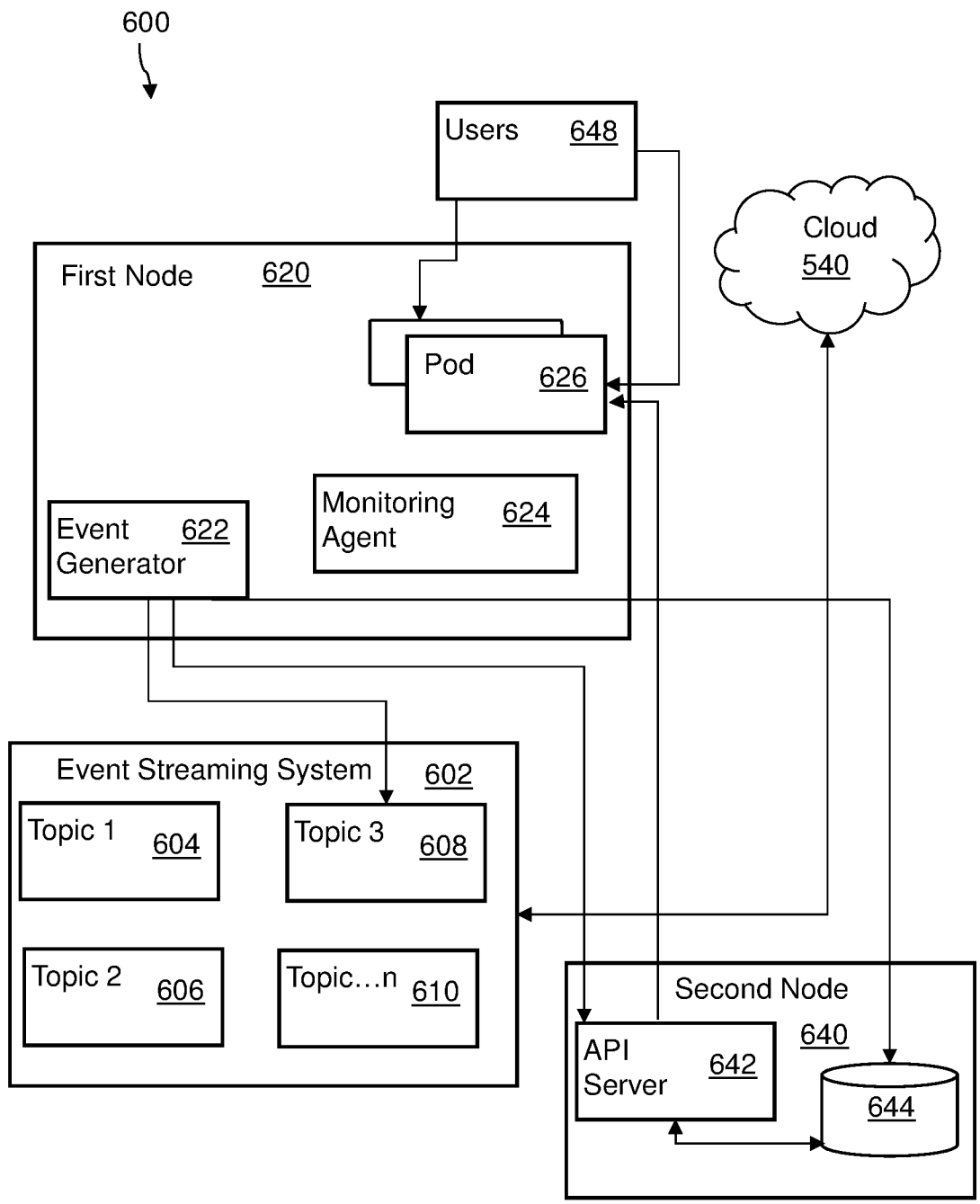
FIG. 6 is a block diagram illustrating another system according to an embodiment of the present disclosure, for managing security access using an event streaming system.

Referring to FIG. 6, in one embodiment according to the present disclosure, a system 600 can include an event streaming system 602, a first node 620 running in a container computer application environment, and a second node 640 also running in a container environment. The event streaming system 602 can include a plurality of topics, for example, topic 1 604, topic 2 606, topic 3 608, topic ... n 610. The first node 620 can include an event generator 622 communicating with a monitoring agent 624. Also, the first node can include a pod 626. The second node can include an API (Application Programing Interface) server 642 communicating with a database 644, such as an open source distributed key-value store used to hold and manage information that distributed systems use, for example, in a container platform. The event generator can communicate with one or more of the topis and the API server and database 644.

The system 600 includes installing an event generator in a node as a long running process. The event generator can register new topics, e.g., represented as Topic 1, topic 2, etc. for any pre-defined events. The event generator can communicate with the API server or database and publish new events for predefined events, e.g., a new resource creation event. The event generator can communicate with the monitoring agent 624 inside the first node and create a new topic when it detects a pod or process which consumes high processing or memory resources, for example topic 3. The event generator can publish a new event when the pod processing usage is over a threshold, for example, 80% of its limitation. When the pod's resource usage is lower than a threshold, the event generator can publish a new event to a topic, for example, topic 3.

In one example, an event adopter can be a system who needs a certain type of event to setup or refresh an access control list (ACL). In one example, the adopter client can adopt an event by installing the adopter client on target system/components, and the adopter can register to event stream system with a client identification. In another example, an adopter can detect if any new message received via a distributed event streaming system. The adopter can receive the security events or messages and apply a new ACL or updated version to a target system. The adopter can notify which security events/messages have been adopted.

Again referring to FIG. 6, in one example, the system 600 can install the event adopter in a node as long as the system is running the process. The event adopter can subscribe exiting topics for any pre-defined events. The event adopter can consume any new event from an existing topic for any pre-defined events. The event adopter can communicate with the API server and update role based access control (RBAC) or network policy for predefined event, e.g.: allow a user to describe pod details. The event adopter can monitor a distributed event streaming system for any new topic from desired source system, e.g., find a new topic from a trusted node or cluster. The event adopter can subscribe to a new topic and consume new message from another. The event adopter can communicate with nodes and the API server and update RBAC or network policy for a new event, e.g., allow a user to run a tool inside a pod. The event adopter can consume a new swipe event and remove an RBAC or network policy.

Figure 7:
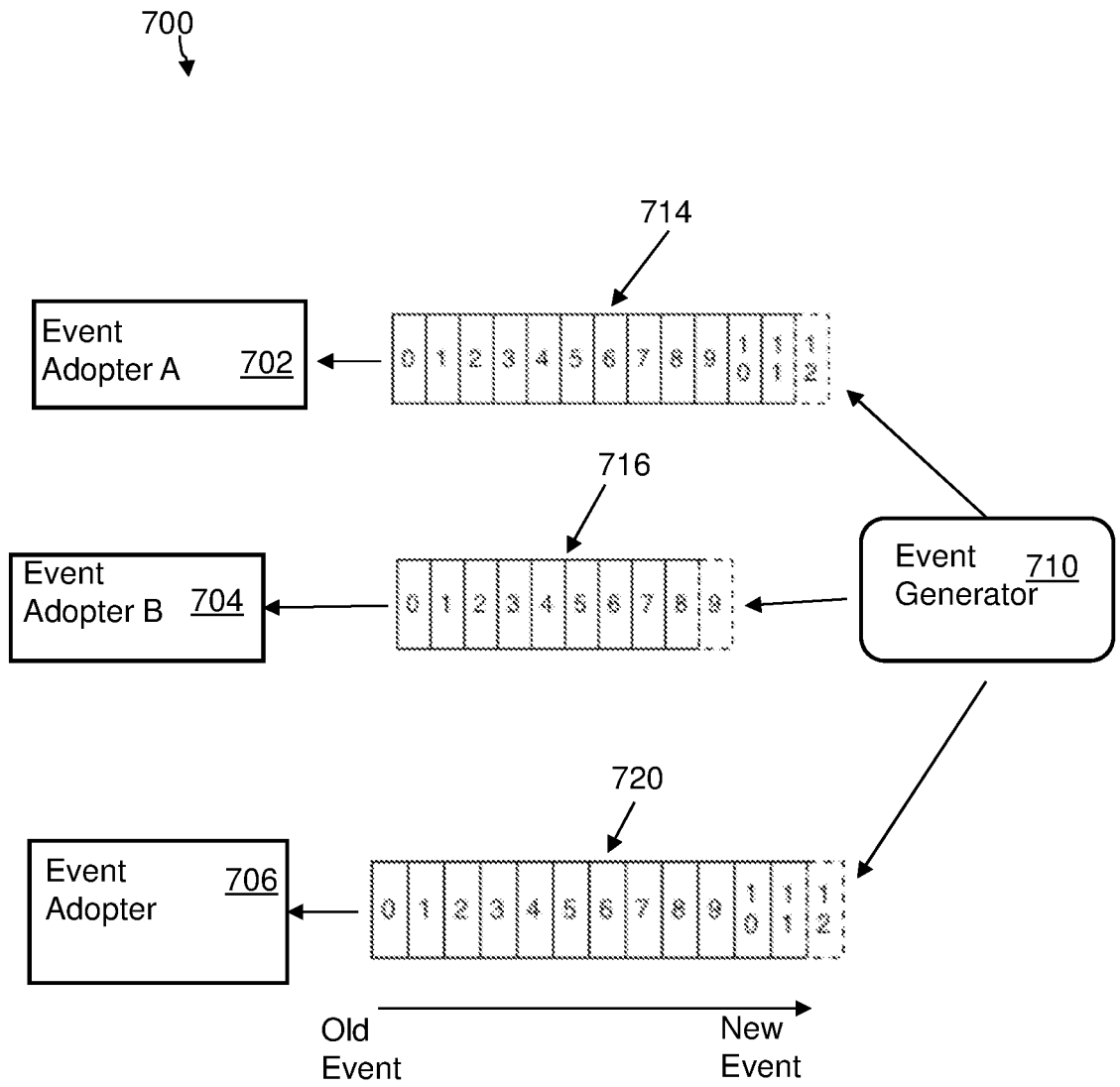
FIG. 7 is a block diagram illustrating another system according to an embodiment of the present disclosure, for managing security access using an event adopter and an event generator.

Referring to FIG. 7, in an embodiment according to the present disclosure, a general scenario can include an experience-based admission control (EBAC). In one example, a general EBAC refresh process can include an event generator detector and publishing an event to a distributed stream system, for example, add a label to a pod. An event adopter can detect a new event in the distributed stream system and pull it to local. The event adopter can decompose the event/message and apply it to the system where the event adopter can allow a pod with a new label to access a resource in a public cloud. The event adopter can detect a new event from a type is in the distributed stream system and pull it to local. The event adopter can decompose the event/message and apply it to the system where the event adopter can allow a user to perform inside of this pod.

Referring to FIG. 7, an event generator 710 generates events. An event adopter A 702 detects and pulls a new event 714, and event adopter 704 detects and pulls a new event 716, and event adopter 706 detects and pulls a new event 720. Digital tables 714, 716, 720 depict old events to new events.

In one example, an event analyzer can be an AI or data analysis system or serverless tool who needs monitor various security events/messages to get a picture of the event flow and changes. A process for an analyzer client to analyze an event can include installing the analyzer client on a target system or a cloud platform. The event analyzer can include registering which event types it will consume or detecting new event type automatically. The event analyzer can include consuming if any new event is received and analyze a security event and help administer to enhance existing access control policy. The event analyzer can include receiving historical events, analyzing an event flood and providing traceable audit information. The event analyzer can include notifying or alerting a system administrator about unusual behaviors via monitoring system.

Figure 8:
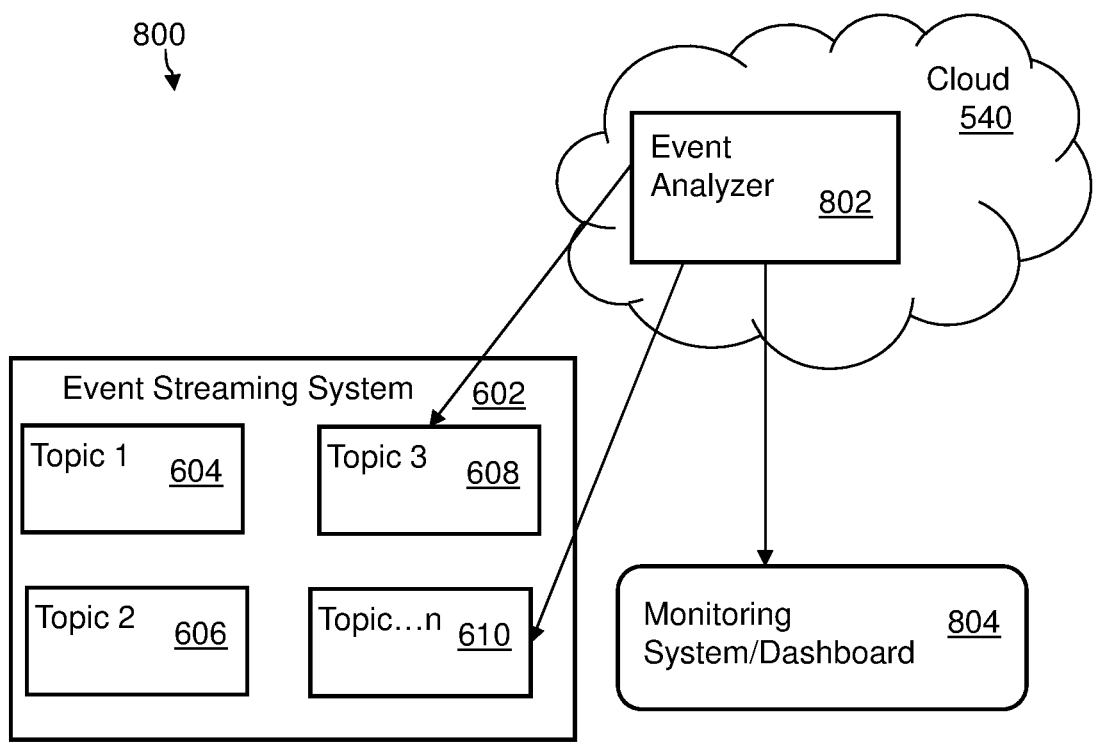
FIG. 8 is a block diagram illustrating another system according to an embodiment of the present disclosure, for managing security access using an event analyzer in a cloud computing environment and a monitoring system.

Referring to FIG. 8, an event streaming system 602 communicates with the cloud 540 including an event analyzer 802. The event analyzer 802 communicates with a monitoring system/dashboard 804. In one example an event analyzer can include installing an event analyzer in k8s cluster or any cloud platform as long running process. The event analyzer can include receiving a new event from existing topics to analyze an event content to determine a kind of event, frequently, and help administrator to enhance existing pre-defined RBAC or network policy etc., for example, make ephemeral network policy to persistent network policy. The event analyzer can include detecting and receiving a new created topic to analyze if the new topic is from a trusted source system through a digital signature. If yes, the new event is made visible to an event adopter. If no, the new event is reported to a monitoring system. The event analyzer can receive historical events to analyze if an event flood happens in a specific time windows and provide traceable audit information.

Figure 9:
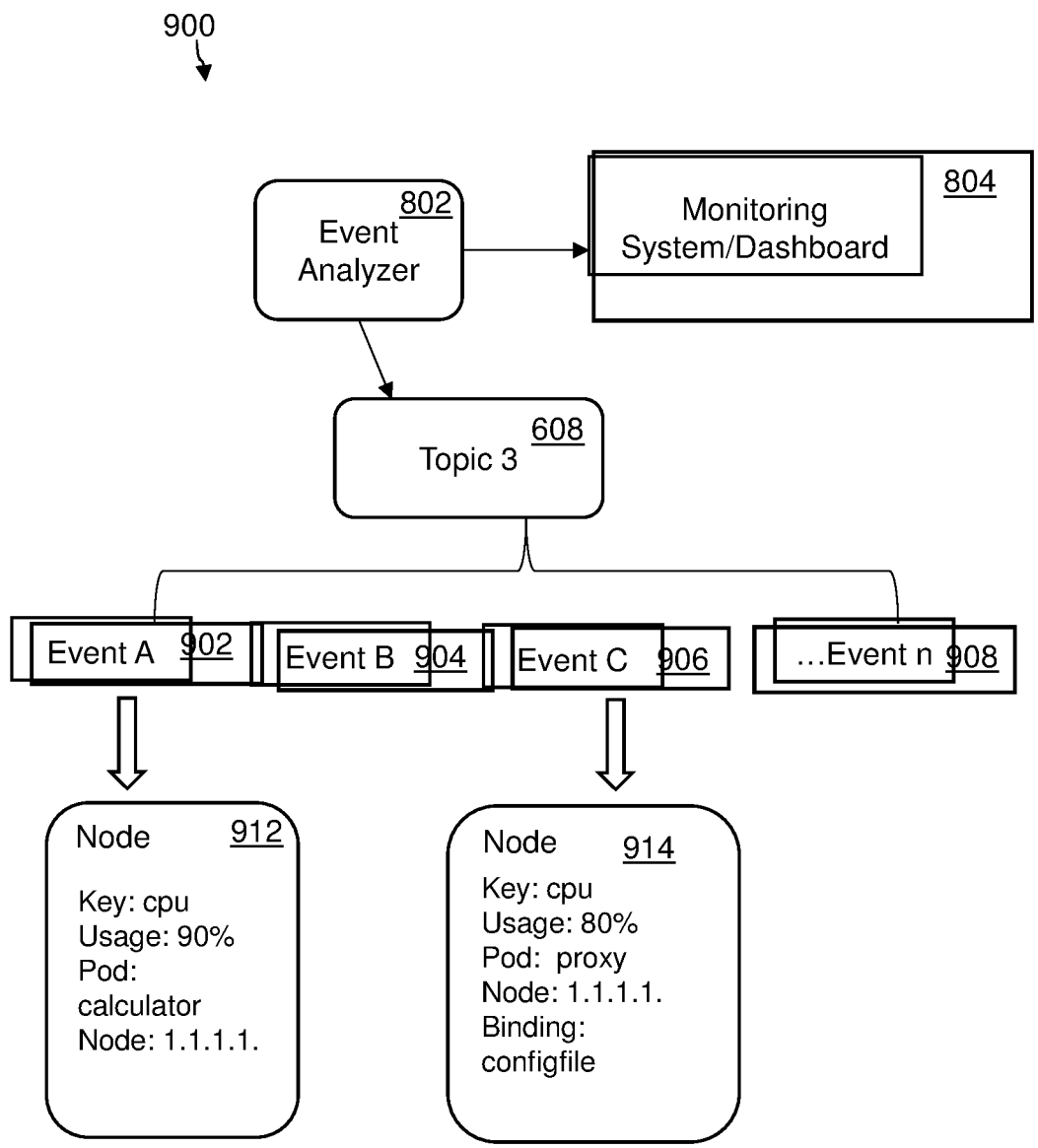
FIG. 9 is a block diagram illustrating another system according to an embodiment of the present disclosure, for managing security access using an event analyzer and a monitoring system.

Referring to FIG. 9, in another embodiment according to the present disclosure, an event analyzer 902 includes reading events, for example, event A 902, event B 904, event C 906, to event N 908. A node 912 ca communicate with the event 1, and a node 914 can communicated with event 3. The events can result from a topic 3 608. The event analyzer 802 can communicate with a monitoring system/dashboard 804.

The event analyzer can include reading an event A 902, to event N 908 from topic 3 608. The analyzer can check the key from the event structure, and determine how may CPU high events occurred and the pod name, etc. The analyzer can summarize the total count of CPU high events for a pod e.g., a calculator happened in a given time window. When the total count is over a threshold, the event analyzer can send out an alert to the monitoring system. The monitoring system can notify event adopters of topic 3 about the frequent events. The event adopters can trigger a process to allow an operations administrator to apply a new persistent ACL based on a CPU (Central Processing Unit) high event to a target system to optimize an existing ACL, e.g., allow an operation to run for a pod calculator by default.

Using the event analyzer, a new label can be added to a pod. For example, the new label can be added to a pod or daemon-set etc., in a IKS cluster. An event generator in an IKS master node can publish the event about a new label and can be added, where the event format can be: [cluster id: pod name: label] . . . The event adopter in an IKS worker node consumes the new event in real-time and can apply the new network policy for the pod with new label. The event adopter in an IKS worker node consumes the new event in real-time and allows specific user/group to perform an operation inside of a pod. A new node is added in a private IKS cluster, and the IP of new node need to be added to the IP (Internet Protocol) whitelist of third-party application. The event generator in an IKS master node can publish the event about a new node being added, and the event format can be: [Cluster id: Node name: New IP Address] . . . The event adopter in a third party application can consume the new event in real-time and add the new IP to an IP whitelist.

Thereby, the present disclosure provides a solution to utilize various events via an event stream system to adopt dynamic ACL in a real-time manner. For example, the present disclosure includes swiping security events/messages and publishing the security events with abnormal behaviors to the monitoring system for further processing.

Figure 10:
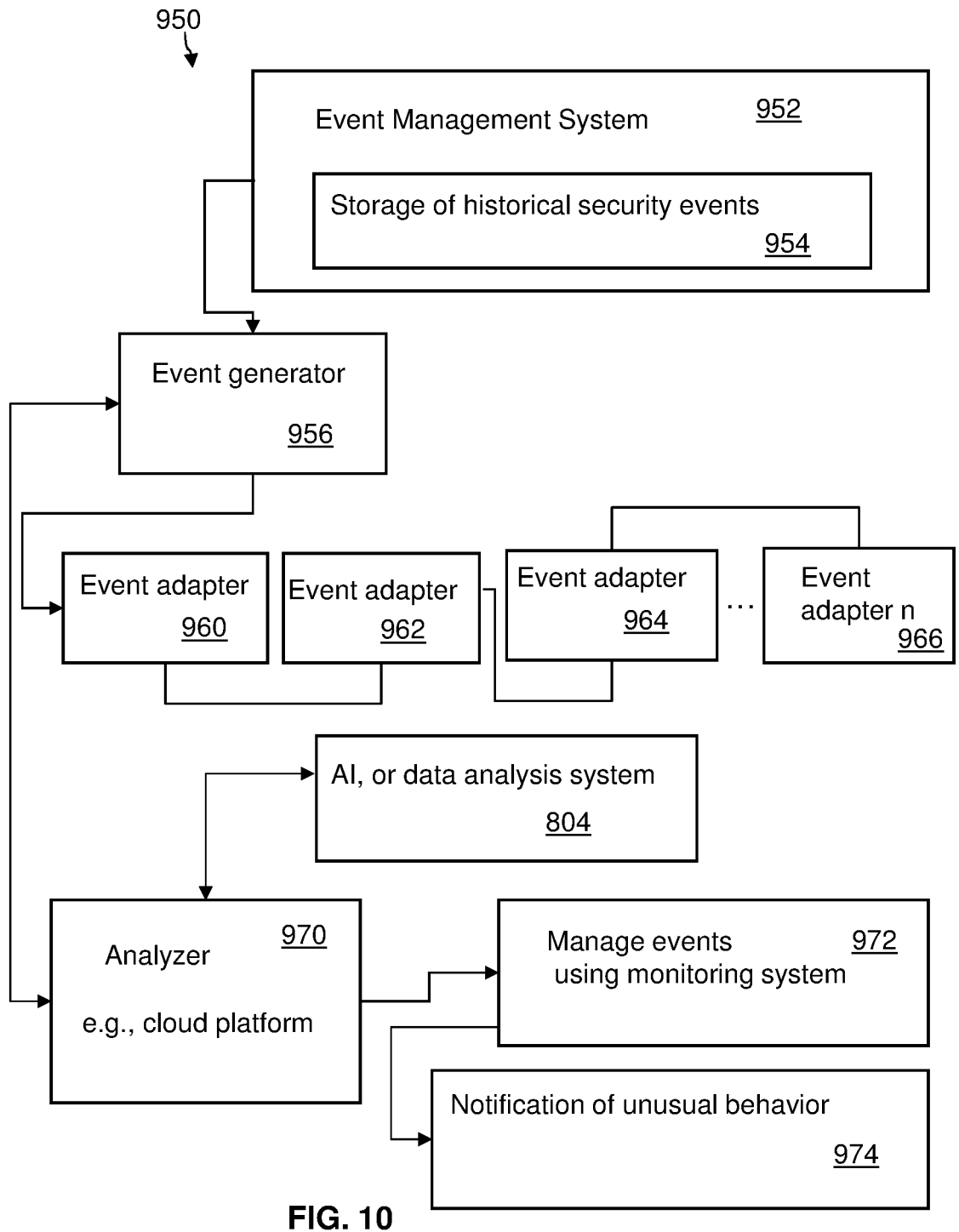
FIG. 10 is a block diagram illustrating another system according to an embodiment of the present disclosure, for managing security access using an event management system, and event generator, and an event adapter.

Referring to FIG. 10, a system 950 according to embodiments of the present disclosure includes an event management system 952 having a storage of historical security events 954. The event management systems 952 communicates with an event generator 956 which generates event adapters, represented by event adapters 960, 962, 964, proceeding to event adapter n 966. The event generator 956 communicates with an analyzer 970 for example, a cloud platform. The analyzer enables managing events using the monitoring system 972, which can generate notifications of unusual behavior 974.

The present disclosure can include a method and system to manage access control lists in a real-time manner, which defines fine-grained security access controls to provide traceable and historical access control lists with flexibility. The method and system can include providing a dynamic operation to rollback access control lists easily, using an event driven based dynamic access management system. More particularly, the method and system can store real-time and historical security event resources/messages, and store a security event's reference and audit information using a distributed stream system which is responsible for event management. A new security event type can be registered into an event stream system using an event generator, the security events/messages can be published, and the security events/messages swiped. Security events/messages can be subscribed from and into the event stream system using an event adopter, which can consume various security events and create or update an access control list. The method and system can consume various security events to analyze historical events using an analyzer, and detect any security events flood or abnormal behaviors to communicate to an event generator to publish events for the monitoring system. Thereby, the method and system can introduce a dynamic and real-time means to manage security access control list in a cloud environment via distributed event stream system.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 11:
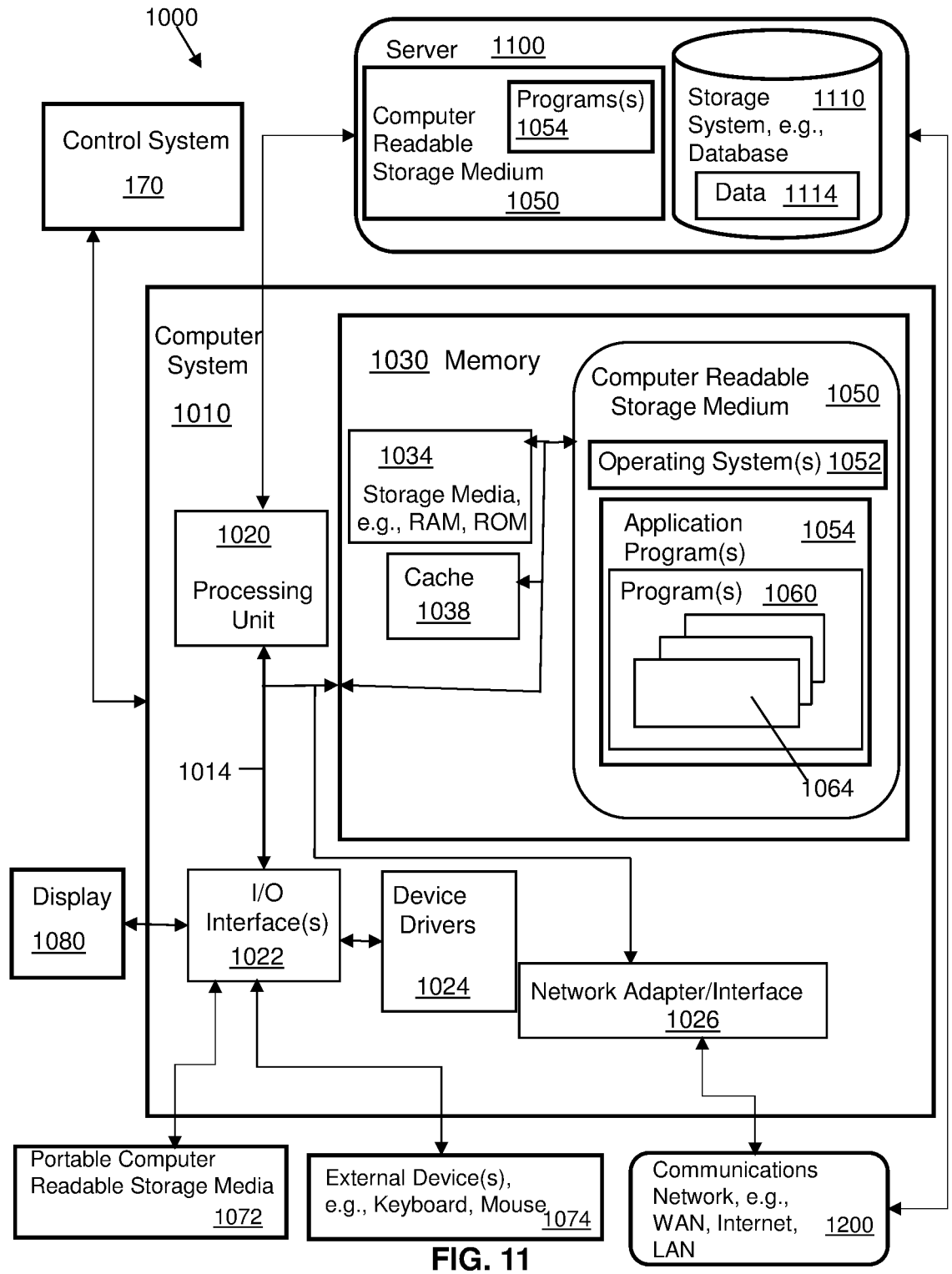
FIG. 11 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 11). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 11 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 11 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration and/or account 181 for users and their devices. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more accounts, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model for monitoring and enhancing performance of containers using a calibration technique.

An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 11, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 12:
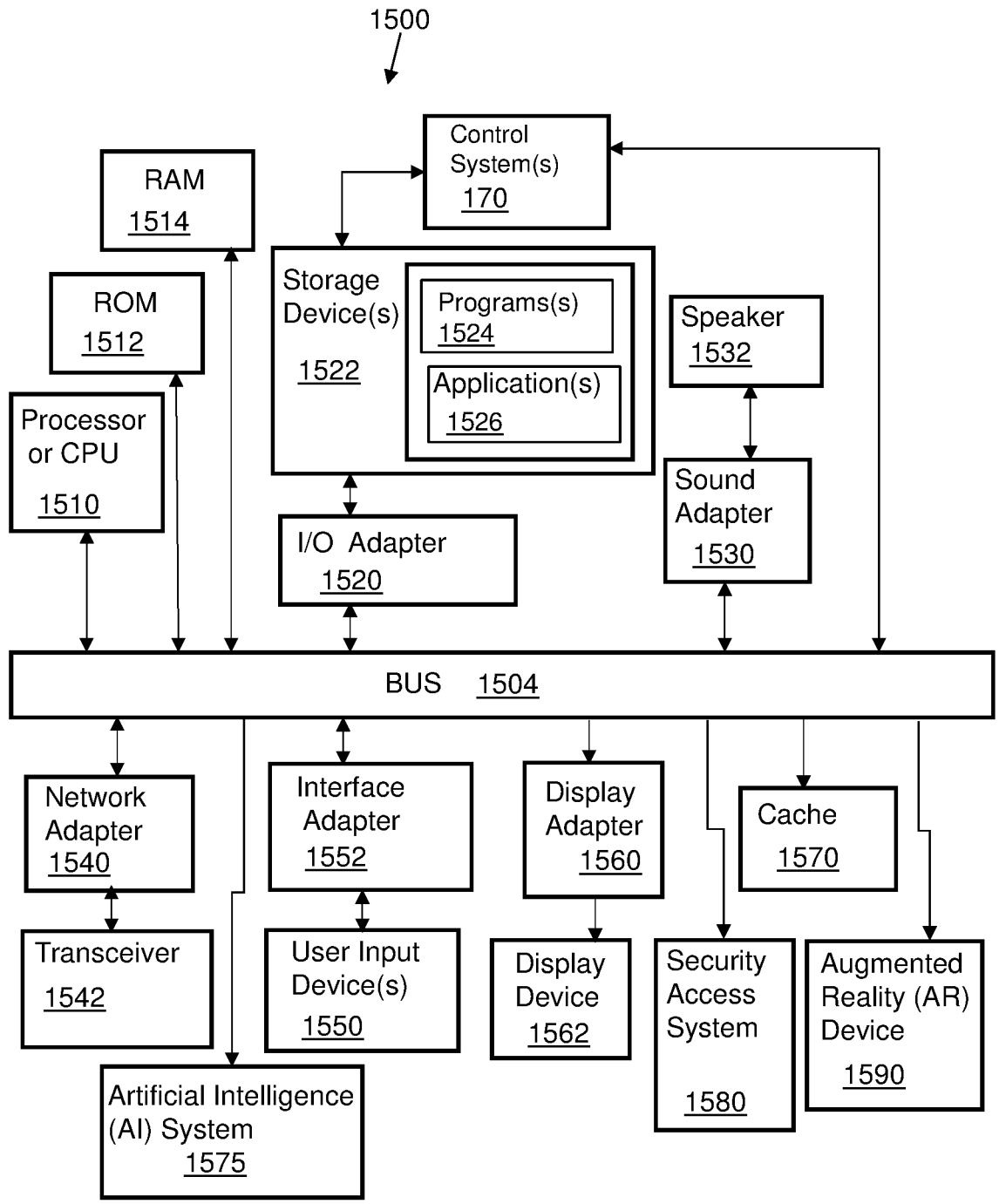
FIG. 12 is a schematic block diagram of a system depicting system components interconnected using a bus. The components for use, in all or in part, with the embodiments of the present disclosure, in accordance with one or more embodiments of the present disclosure.

Referring to FIG. 12, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1590 can also be operatively coupled to the bus 1504. A security access management system 1580 can also be operatively coupled to the bus 1504. An artificial intelligence (AI) ecosystem 1575 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
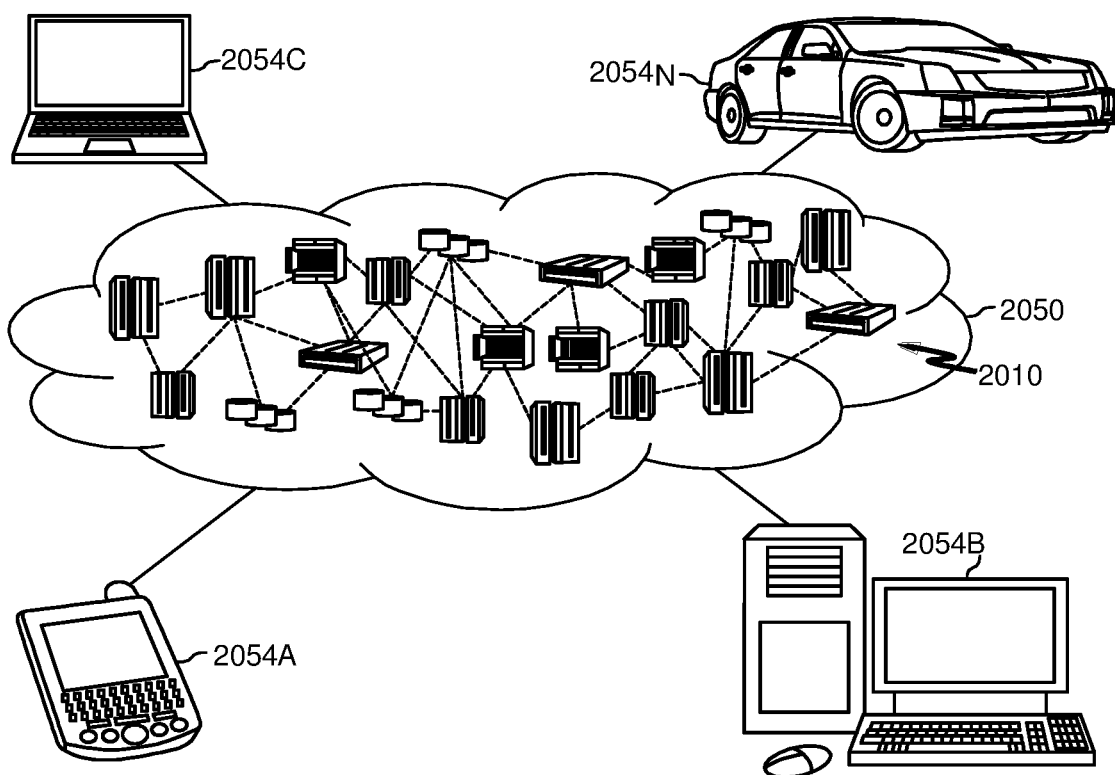
FIG. 13 is a block diagram depicting a cloud computing environment according to an embodiment of the present invention.

Referring now to FIG. 13, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 13 are intended to be illustrative only and that computing nodes 2010 and cloud computing environment 2050 can communicate with any type of computerized device over any type of network and/or network addressable connection (e.g., using a web browser).

Figure 14:
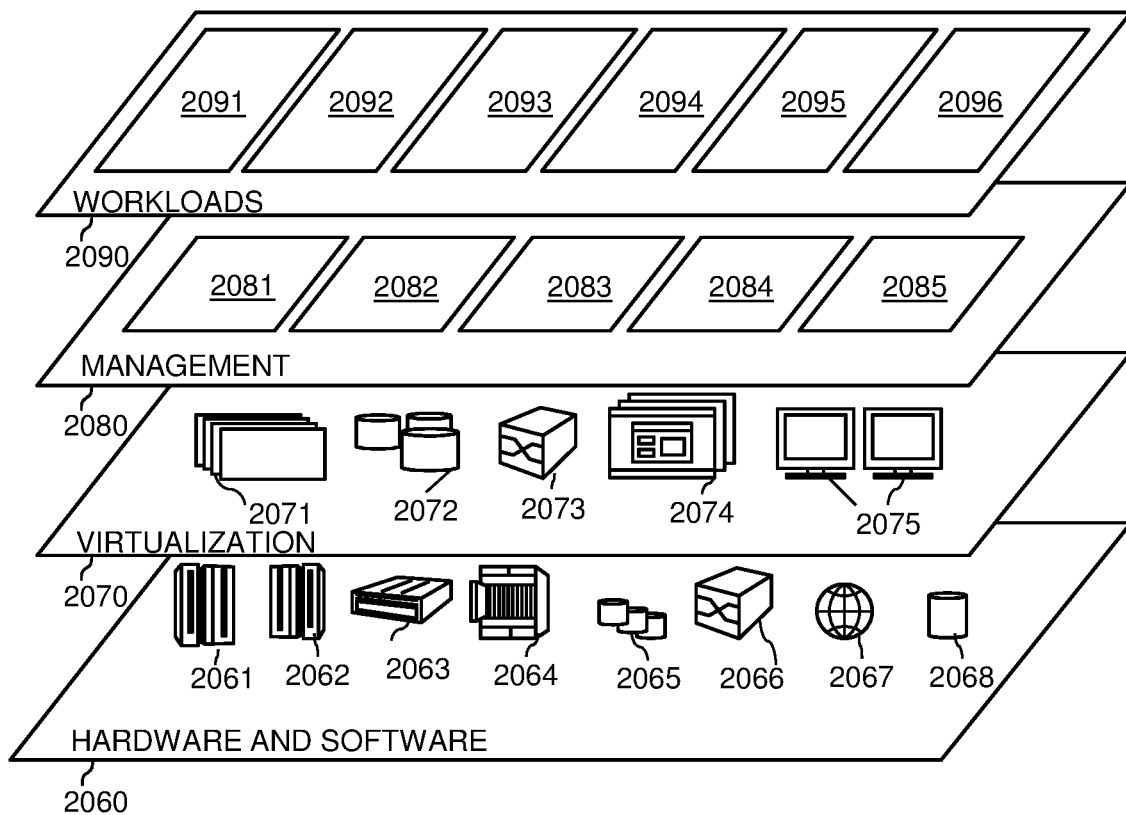
FIG. 14 is a block diagram depicting abstraction model layers according to an embodiment of the present invention.

Referring now to FIG. 14, a set of functional abstraction layers provided by cloud computing environment 2050 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and a dynamic access management system 2096, for example, for controlling access lists to a computer system.

What is claimed is:

1. A computer-implemented method for managing security access in real-time, comprising:
    detecting, at a computer, a security event at a computer system;
    analyzing, using the computer, the security event, and subscribing the security event to an event manager, the analyzing of the security event including an analysis of a historical corpus having historical data of security events;
    generating an access control list based on the security event;
    determining when the security event includes abnormal behavior based on the analyzing of the security event and the analysis of the historical corpus;
    publishing the security event to a monitoring system, using the event manager, for controlling access to the computer system, in response to the determining of the security event including the abnormal behavior;
    storing a reference and audit information of the security event using the event manager;
    registering a new security event type into an event stream system using the event manager;
    receiving, at an event analyzer, a new event from a topic and analyzing the new event, the event analyzer communicating with the computer;
    reading, using the event analyzer, the new event to determine when CPU high events occur;
    in response to a threshold of CPU high events occurring, the event analyzer sending an alert to the monitoring system;
    adding a new label for the new event to a pod;
    publishing, using an event generator in a master node, the new event with the new label;
    consuming the new event in real-time at a worker node using an event adapter which allows a specific user/group to perform an operation inside of the pod;
    applying a new network policy for the pod with the new label; and
    using the event generator in the master node, publishing the new event about a new node being added.

2. The method of claim 1, wherein an event includes access to at least a portion of computer data in th computer system.

3. The method of claim 1, wherein the historical corpus further comprises historical data including security resources, security messages, and security audit information.

4. The method of claim 1, further comprising:
    communicating with a course system to detect the security event; and
    generating pre-defined events regularly.

5. The method of claim 1, further comprising:
    communicating with the monitoring system to detect dynamic security events in real-time.

6. The method of claim 1, further comprising:
    determining event types for security events; and
    sending a security message with an event type for each of the security events to the monitoring system.

7. The method of claim 1, further comprising:
determining an event type for the security event;
registering the event type with the monitoring system; and
sending a security message of the security event and the event type to the monitoring system.

8. The method of claim 1, wherein the monitoring system includes a distributed event streaming system.

9. The method of claim 1, further comprising:
generating a model, using the computer, which at least in part incorporates the analyzing of the security event; and
the generating the model including:
updating the analysis of the security event;
updating the access control list;
updating the determination of when the security event includes the abnormal behavior; and
updating the publishing of the security event.

10. The method of claim 9, further comprising:
iteratively generating the model to produce updated models.

11. A system using a computer for managing security access in real-time, which comprises:
a computer system including a computer processor, a computer-readable storage medium, and program instructions stored on the computer-readable storage medium being executable by the processor, to cause the computer system to perform the following functions to;
detect, at a computer, a security event at a computer system;
analyze, using the computer, the security event, and subscribe the security event to an event manager, the analyzing of the security event including an analysis of a historical corpus having historical data of security events;
generate an access control list based on the security event;
determine when the security event includes abnormal behavior based on the analyzing of the security event and the analysis of the historical corpus;
publish the security event to a monitoring system for controlling access to the computer system, in response to the determine of the security event including the abnormal behavior;
store a reference and audit information of the security event using the event manager;
register a new security event type into an event stream system using the event manager;
receive, at an event analyzer, a new event from a topic and analyzing the new event, the event analyzer communicating with the computer;
read, using the event analyzer, the new event to determine when CPU high events occur;
in response to a threshold of CPU high events occurring, the event analyzer sends an alert to the monitoring system;
add a new label for the new event to a pod;
publish, using an event generator in a master node, the new event with the new label;
consume the new event in real-time at a worker node using an event adapter which allows a specific user/group to perform an operation inside of the pod;
apply a new network policy for the pod with the new label; and
using the event generator in the master node, publish the new event about a new node being added.

12. The system of claim 11, wherein the historical corpus further comprises historical data including security resources, security messages, and security audit information.

13. The system of claim 11, further comprising:
communicating with a course system to detect the security event; and
generating pre-defined events regularly.

14. The system of claim 11, further comprising:
communicating with the monitoring system to detect dynamic security events in real-time.

15. The system of claim 11, further comprising:
determining event types for security events, and
sending a security message with an event type for each of the security events to the monitoring system.

16. The system of claim 11, further comprising:
determining an event type for the security event;
registering the event type with the monitoring system; and
sending a security message of the security event and the event type to the monitoring system.

17. The system of claim 11, wherein the monitoring system includes a distributed event streaming system.

18. The system of claim 11, further comprising:
generating a model, using the computer, which at least in part incorporates the analyzing of the security event; and
the generating the model including:
updating the analyzing of the security event;
updating the access control list;
updating the determination of when the security event includes the abnormal behavior; and
updating the publishing of the security event.

19. The system of claim 18, further comprising:
iteratively generating the model to produce updated models.

20. A computer program product for managing security access in real-time, the computer program product comprising a computer readable storage medium having program instructions embodied therewith, the program instructions executable by a computer to cause the computer to perform functions, by the computer, comprising the functions to:
detect, at a computer, a security event at a computer system;
analyze, using the computer, the security event, and subscribe the security event to an event manager, the analyzing of the security event including an analysis of a historical corpus having historical data of security events;
generate an access control list based on the security event;
determine when the security event includes abnormal behavior based on the analyzing of the security event and the analysis of the historical corpus;
publish the security event to a monitoring system for controlling access to the computer system, in response to the determine of the security event including the abnormal behavior;
store a reference and audit information of the security event using the event manager;
register a new security event type into an event stream system using the event manager;
receive, at an event analyzer, a new event from a topic and analyzing the new event, the event analyzer communicating with the computer;
read, using the event analyzer, the new event to determine when CPU high events occur;
in response to a threshold of CPU high events occurring, the event analyzer sends an alert to the monitoring system;
add a new label for the new event to a pod;
publish, using an event generator in a master node, the new event with the new label;

consume the new event in real-time at a worker node using an event adapter which allows a specific user/group to perform an operation inside of the pod;

apply a new network policy for the pod with the new label; and using the event generator in the master node, publish the new event about a new node being added.

* * * * *